No. 852,821. PATENTED MAY 7, 1907.
W. A. & J. L. COE.
WEANING BIT.
APPLICATION FILED OCT. 13, 1906.
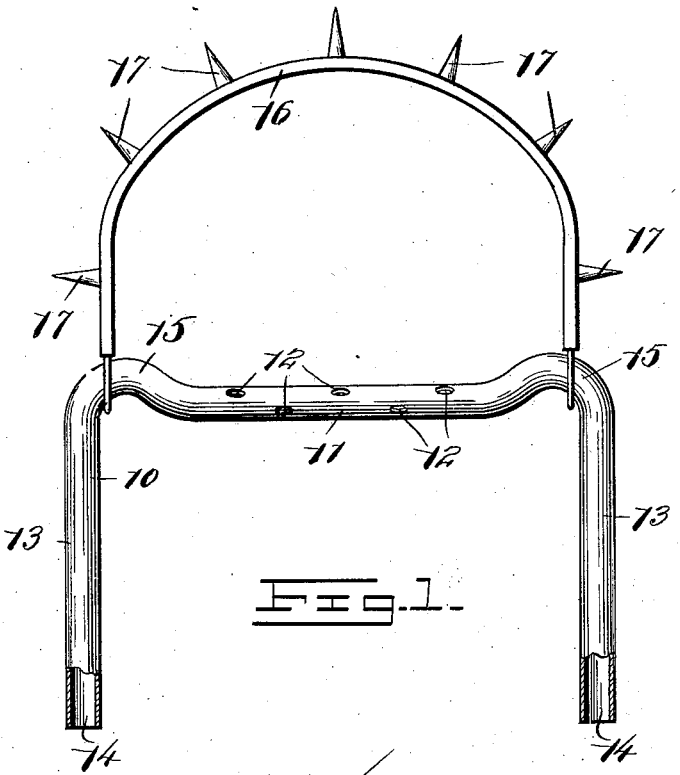
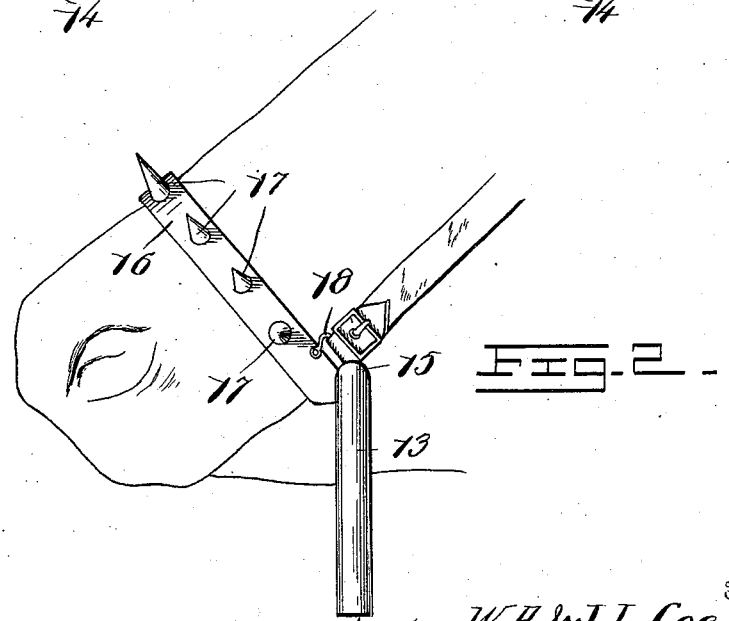

UNITED STATES PATENT OFFICE.

WILLIAM A. COE AND JAMES L. COE, OF MANNSVILLE, INDIAN TERRITORY.

WEANING-BIT.

No. 852,821.      Specification of Letters Patent.      Patented May 7, 1907.

Application filed October 13, 1906. Serial No. 338,746.

*To all whom it may concern:*

Be it known that we, WILLIAM A. COE and JAMES L. COE, citizens of the United States, residing at Mannsville, in the Chickasaw Nation, Indian Territory, have invented certain new and useful Improvements in Weaning-Bits; and we do hereby declare the following to be a full, clear, and exact description of the invention, such as will enable others skilled in the art to which it appertains to make and use the same.

This invention has relation to bits for colts, calves, and other young animals to prevent them from sucking during time of weaning.

The nature of the invention consists of a hollow bit bent inwardly at its center, which is provided with holes, and having its ends bent at right angles to its center, which ends are allowed to hang down when the animal attempts to drink, or when its head is raised, and to be bent backward and drag upon the ground when it is grazing. The bit is provided with a nose-band having outstanding pointed sprigs, the said band being also provided with wire loops for the attachment of a suitable head-band thereto.

The invention is shown as embodied in the device as shown in the annexed drawing forming a part of this specification, and in view of which it will first be described in detail and then be pointed out in the subjoined claim.

Of the said drawing,—Figure 1 is a plan of the invention. Fig. 2 is a perspective view showing the position of the parts extending from the mouth and on the nose of an animal.

Similar numerals of reference designate similar parts or features, as the case may be, wherever they occur.

In the drawing 10 designates the bit which is made of suitable tubular material, and is provided at its central portion 11, that is designed to go in the animal's mouth with a number of holes 12. The end portions 13 of the bit are bent at right angles to the central portion and are open at their terminals 14 so that should the animal attempt to suck, air will be drawn in through the ends of the tubes and out of the holes 12, and its said attempt will be thwarted.

The central portion of the bit is bent inward, so that the turns by which the end portions 13 are made to extend at right angles to the part 12 are rounded, as at 15, and the said rounded parts are slightly arched upward from the plane of the bit proper. The nose-band 16 is connected with the angular portions 13 near the arched bend 15 and is provided with sharp pointed sprigs 17, that extend outward radially from the band 16, and the latter near its connection with the bit is provided with wire loops 18, to which the ends of a head-band or a halter may be secured.

In use, the bit 11 will extend through the animal's mouth with the angular end portions 13 depending therefrom when the animal attempts to drink, which will be accomplished by drawing the water in through the ends 14 and out through the holes 12, as well as through the mouth in the natural way, and when the animal is grazing the terminals 14 will drag upon the ground and will be turned backward so as not to prevent feeding. By bending the central portion of the bit inwardly as shown and described, so that the arched bends 15 will extend upward or outward slightly, the bit is made to fit the animal's mouth more perfectly than should the bit proper be made straight, and furthermore by the form described, when the bit is in the animal's mouth, its sides will be supported by the jaws and lower lips, so as to secure a vertical position of the end portion 13, when the animal holds its head up or when it attempts to drink as stated. It is to be noted also that when the animal is grazing and the vertical portions of the bit drag upon the ground and are bent backward, the bit proper in the mouth of the animal is somewhat raised through the medium of the arched bends 15 so as to lift it somewhat from the animal's tongue and thus enable it to pasture more liberally.

What is claimed is:—

As an article of manufacture, a weaning-bit comprising an open ended tube, having the end portions bent at substantially right angles to the central portion, the latter forming the mouth-piece or bit proper, extending normally in a horizontal plane, and having holes formed therethrough the said bit, at its ends, being provided with rounded bends arched upwardly and the end portions extending vertically downward.

In testimony whereof, we affix our signatures, in presence of two witnesses.

W. A. COE.
                         J. L. COE.

Witnesses:
     C. A. MITCHUSSON,
     H. G. FOSTER.